(12) United States Patent
Murphy

(10) Patent No.: US 9,112,762 B2
(45) Date of Patent: Aug. 18, 2015

(54) DIGITAL MOBILE PASSIVE LEAK DETECTION FOR BROADBAND COMMUNICATION SYSTEM

(71) Applicant: ComSonics, Inc., Harrisonburg, VA (US)

(72) Inventor: John J. Murphy, Mt. Crawford, VA (US)

(73) Assignee: ComSonics, Inc., Harrisonburg, VA (US)

( * ) Notice: Subject to any disclaimer, the term of this patent is extended or adjusted under 35 U.S.C. 154(b) by 48 days.

(21) Appl. No.: 13/789,874

(22) Filed: Mar. 8, 2013

(65) Prior Publication Data

US 2013/0322569 A1 Dec. 5, 2013

Related U.S. Application Data

(60) Provisional application No. 61/654,269, filed on Jun. 1, 2012.

(51) Int. Cl.
*H03D 1/24* (2006.01)
*H04L 27/38* (2006.01)

(52) U.S. Cl.
CPC ..................................... *H04L 27/38* (2013.01)

(58) Field of Classification Search
CPC ....... H04L 27/06; H04L 27/38; H04L 27/066; H04L 27/22; H04L 27/0008; H04L 27/2332; H04L 27/2273; H04L 27/1563; H04L 2027/0067; H04L 2027/0057; H04L 1/206; H04L 7/0334; H04N 5/4401; H03D 3/007

USPC .................................................. 375/320–328
See application file for complete search history.

(56) References Cited

U.S. PATENT DOCUMENTS

| | | | | |
|---|---|---|---|---|
| 5,953,670 A * | 9/1999 | Newson | .................... | 455/454 |
| 5,987,073 A * | 11/1999 | Knutson | .................... | 375/326 |
| 7,103,047 B1 * | 9/2006 | Wingfield | .................... | 370/395.1 |
| 7,170,956 B1 * | 1/2007 | Fong et al. | .................... | 375/344 |
| 7,376,387 B1 * | 5/2008 | Eck | .................... | 455/3.06 |
| 2004/0264600 A1 * | 12/2004 | Kao et al. | .................... | 375/316 |
| 2005/0053026 A1 * | 3/2005 | Mullan et al. | .................... | 370/316 |
| 2008/0032660 A1 * | 2/2008 | Clark et al. | .................... | 455/323 |
| 2012/0041701 A1 * | 2/2012 | Hillman et al. | .................... | 702/67 |
| 2012/0218419 A1 * | 8/2012 | Massey | .................... | 348/180 |

* cited by examiner

*Primary Examiner* — Dac Ha
*Assistant Examiner* — Janice Tieu
(74) *Attorney, Agent, or Firm* — Whitham Curtis Christofferson & Cook, PC

(57) ABSTRACT

Passive detection of a quadrature amplitude modulated (QAM) signal amid noise is achieved by detection of a spectral component of a detected signal that corresponds to a known QAM symbol rate in, for example, a QAM modulated broadband communication system (BCS). Improved authentication can be provided by simultaneously detecting symbol rate components in two or more QAM bands. No modification of a broadband communication system such as by including a marker signal is required and thus there is no requirement for dedication of a portion of the broadband communication system spectrum or problem of marker signal interference with BCS signals.

22 Claims, 4 Drawing Sheets

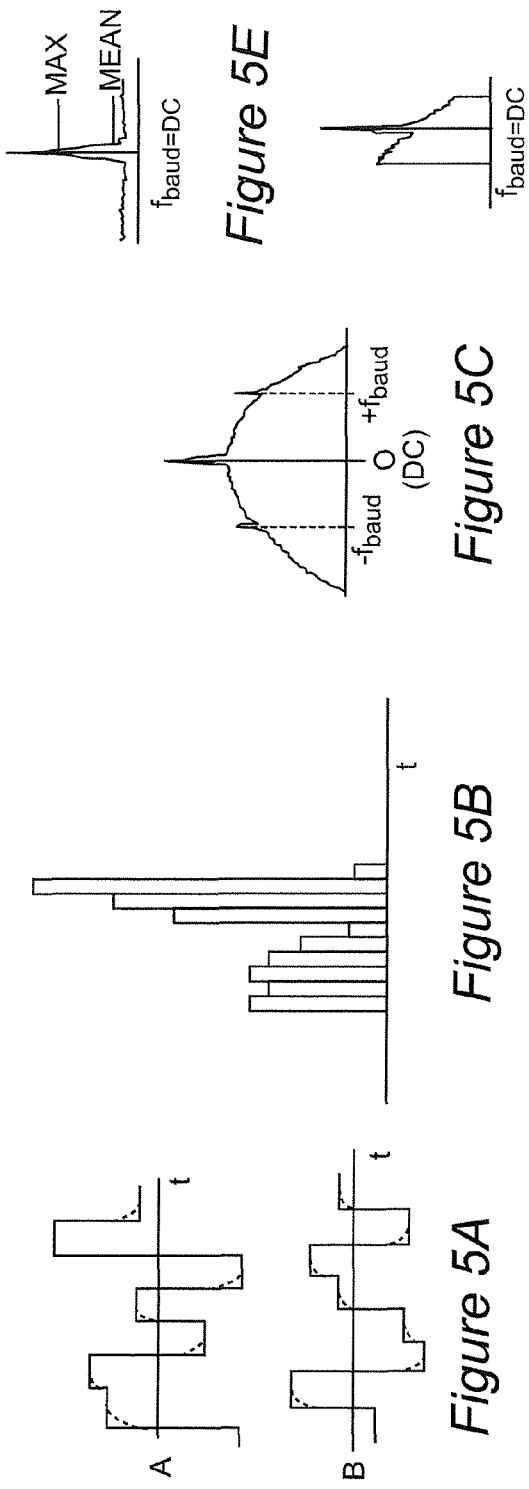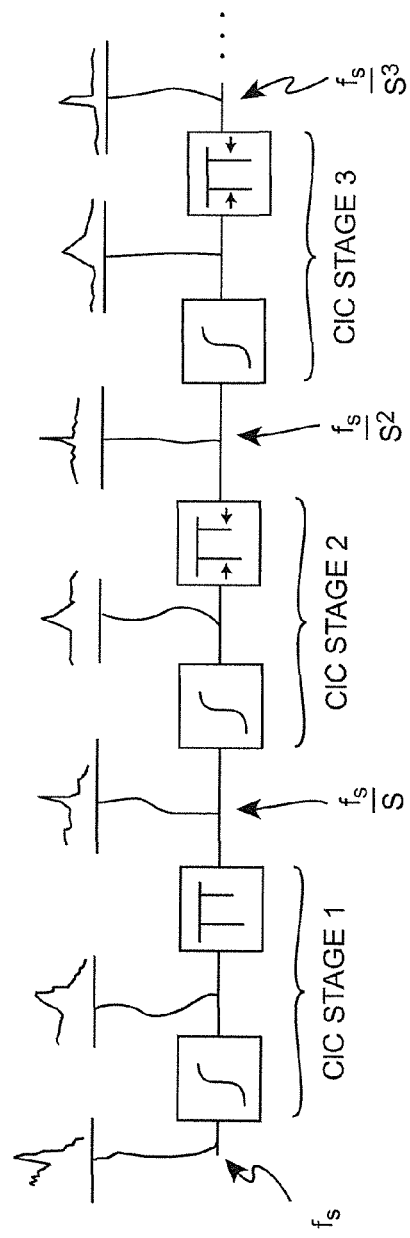

US 9,112,762 B2

DIGITAL MOBILE PASSIVE LEAK DETECTION FOR BROADBAND COMMUNICATION SYSTEM

CROSS-REFERENCE TO RELATED APPLICATION

This application claims benefit of priority of U.S. Provisional Patent Application 61/654,269, filed Jun. 1, 2012, which is hereby incorporated by reference it its entirety.

FIELD OF THE INVENTION

The present invention generally relates to maintenance of cable telecommunication systems and, more particularly, to detection of cable shielding flaws in such systems in which the communicated signal is quadrature amplitude modulated (QAM).

BACKGROUND OF THE INVENTION

Cable telecommunications systems have been known for a number of years and are currently gaining in popularity and coverage for the distribution of television programming, telephone service and networking of computers such as providing Internet access since they can carry many signals over a wide bandwidth with little, if any interference or distortion, particularly as data transmission rates have increased to accommodate high definition television, increased volume of digital communication and the like. By the same token, since these communications are intended to be confined within the cable system, the increased bandwidth required for such communications need not be allocated from the available bandwidth for other communications such as radio, navigation, GPS, emergency communications and the like which must be transmitted as free-space electromagnetic waves through the environment. However, flaws in cable shielding in cable telecommunication systems can allow signal egress which can potentially interfere with broadcast communications and potentially cause hazards. Reciprocally, flaws in cable shielding can permit signal ingress into the cable from the environment and degrade or interfere with the signal being carried by the cable telecommunication system. Therefore, such flaws must be quickly discovered and remedied as they occur due to weather, mechanical damage or the like.

Detection of cable shielding flaws is generally achieved through detection of a signal carried by the cable transmission system that has leaked into the environment, essentially by being broadcast from the shielding flaw. Detection of a signal that has leaked or egressed from a cable flaw is generally performed in two stages: first, by a receiver in a mobile vehicle driven in the general vicinity of installed cables that associates a received signal with a location of the mobile vehicle using a global positioning system (GPS) receiver which thus reports a general location of a shielding flaw and, second, by a hand-held instrument that can allow repair personnel to follow increasing egress signal strength to the exact location of the shielding flaw so that repairs and/or maintenance can be carried out.

Of course, such detections must be carried out in an environment in which noise as well as broadcast signals will also be present in the same frequency bands. Accordingly, a problem with all such systems is to identify a received signal as one originating in the cable telecommunications system. For example, in systems in which at least some television programming is carried as an amplitude modulated signal such as an amplitude modulated NTSC signal (as was historically the case for all television programming), leakage detection equipment could monitor the television channel visual carrier frequency. However, in recent years, to increase the amount of information that can be transmitted over a cable system and to support additional data services such as telecommunications and computer networking (e.g. Internet access), more efficient digital communications using a form of quadrature amplitude modulation (QAM) are being increasingly employed to the virtual exclusion of analog communications over broadband cable communication systems. The resulting signal spectrum on the cable system is of substantially constant amplitude (since the carrier is suppressed in each of the many closely spaced frequency bands within the broadband spectrum) and thus closely resembles white broadband background noise that may contain any number of free-space broadcast signals. Further, the signal-to-noise ratio (SNR) of an egress signal, when present in such background noise may be −25 dB or less relative to the background noise. Therefore, it has proven extremely difficult to distinguish and authenticate a signal representing signal egress from a broadband communication system transporting only QAM signaling from the background noise at any given location.

Therefore, prior egress signal detectors for use in a QAM environment have employed active addition of marker signals to facilitate detection and authentication of a detected signal as an egress signal from a broadband communication system even though use of such a marker signal generally requires that a finite portion of the available bandwidth be dedicated to the marker signal. Further, use of a marker signal while seeking to minimize the bandwidth allocated to it implies a need for accurate control of both frequency and signal strength of the marker signal in avoiding interference with signals in adjacent frequency bands carrying information in the cable system as is provided in U.S. patent application Ser. No. 13/080,715 by John Murphy et al. now U.S. Pat. No. 8,749,248, issued Jun. 10, 2014, which is hereby fully incorporated by reference and provides a system for successfully managing use of a marker signal for egress signal detection in a QAM environment in order to minimize both the amount of bandwidth dedicated to the marker signal and interference of the marker with information signals carried by the system. This system also provides the facility of distinguishing between broadband communication systems that may be constructed in close physical proximity to each other (often referred to as systems which are built over each other or "over-built") although some complexity in providing different marker signals in the respective systems has been encountered.

SUMMARY OF THE INVENTION

It is therefore an object of the present invention to provide a method and system for detection and authentication of a received signal as an egress signal from a broadband communication signal without use of any type of marker signal or any other modification of existing broadband communication system infrastructure even when all signals carried by the broadband communication system are quadrature amplitude modulated.

In order to accomplish these and other objects of the invention, a detector for detecting a quadrature amplitude modulated (QAM) signal is provided comprising a mixer to mix a detected signal with an oscillator output wherein said oscillator is tuned to operate at a carrier frequency of a QAM band, to develop a quadrature baseband signal, a further mixer for mixing a signal corresponding to said quadrature baseband signal with an output of a further oscillator wherein said further oscillator is tuned to operate at a QAM symbol rate of said QAM band, and a processor to analyze a spectrum of an output of the further mixer to detect presence of a signal at a frequency corresponding to said QAM symbol rate.

In accordance with another aspect of the invention, a method is provided for detecting a quadrature amplitude modulated (QAM) signal comprising steps of mixing a detected signal with an oscillator output wherein said oscillator is tuned to operate at a carrier frequency of a QAM band, to develop a quadrature baseband signal, further mixing a signal corresponding to said quadrature baseband signal with an output of a further oscillator wherein said further oscillator is tuned to operate at a QAM symbol rate of the QAM band, and analyzing a spectrum of an output of said further mixer to detect presence of a signal at a frequency corresponding to said QAM symbol rate.

BRIEF DESCRIPTION OF THE DRAWINGS

The foregoing and other objects, aspects and advantages will be better understood from the following detailed description of a preferred embodiment of the invention with reference to the drawings, in which:

FIGS. 5A, 5B, 5C, 5D and 5E are illustrations of the spectra of signals at various points in the passive egress signal detection system of FIG. 4, and FIG. 6 is a more detailed block diagrams of a portion of the system of FIG. 4.

DETAILED DESCRIPTION OF A PREFERRED EMBODIMENT OF THE INVENTION

Figure 1A:
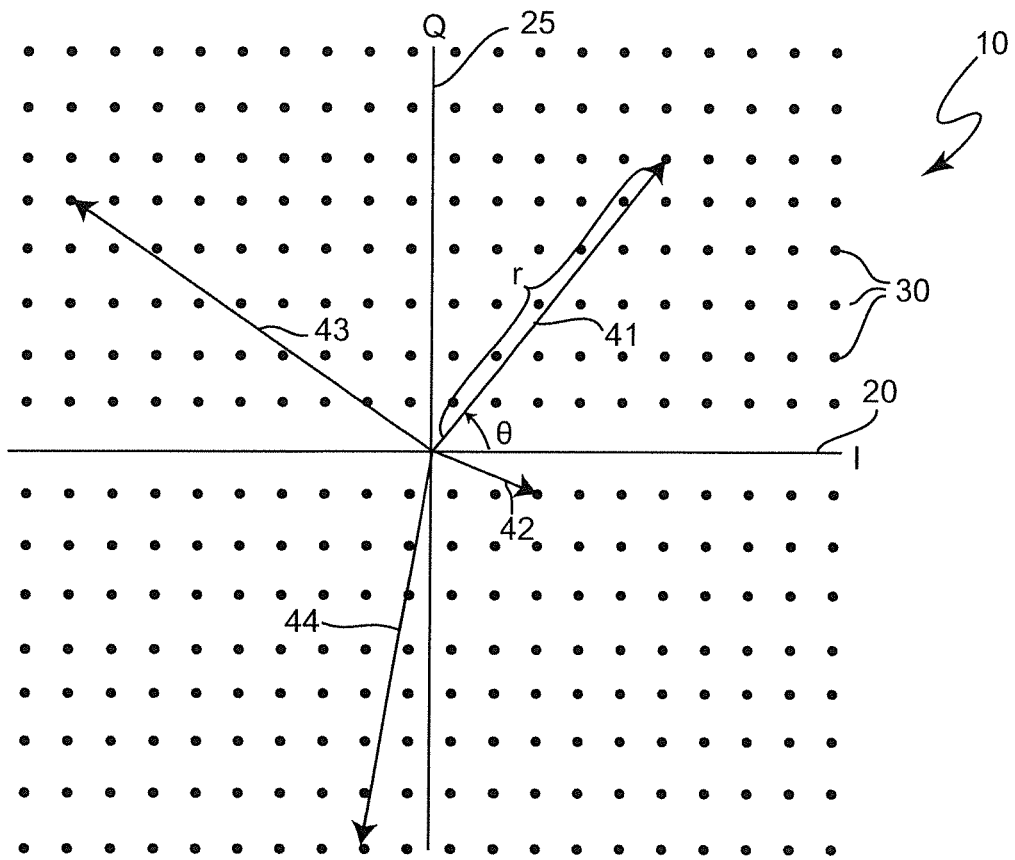
FIGS. 1A and 1B are illustrations of the theory of QAM modulation to facilitate an understanding of the operation of the invention, FIGS. 2A and 2B provide a graphical comparison of spectra of white background noise and a fully QAM modulated signal in a broadband communication signal over the frequency band of the broadband communication system.

Referring now to the drawings, and more particularly to FIG. 1A, there is shown an illustration of the basic symbol coding scheme of quadrature amplitude modulation (QAM). This coding scheme is based on particular discrete symbols which are arbitrary in number although a coding scheme employing 256 discrete symbols, as is prevalent in the United States, will be used as being illustrative of the technique. Some details of the scheme are simplified from the common practice of QAM for clarity of illustration and explanation and therefore, no portion of FIG. 1A is admitted to be prior art in regard to the present invention although the underlying theory is well-known. FIG. 1A is therefore labeled as "Related Art".

FIG. 1A illustrates a rectangular array 10 extending in orthogonal and independent dimensions Q (20) and I (25). Discrete combinations of allowable values in each of the Q and I dimensions are indicated by dots 30. Since the dimensions are orthogonal and independent, the values in the respective Q and I dimensions (sometimes referred to as real, $\Re$, and imaginary, $\Im$, components of a signal) can represent instantaneous values of separate and independent signals that may be modulated and transmitted together on a single carrier frequency and later demodulated into the original signals. Since sixteen discrete (non-zero, in this illustrative case) allowable values are presented, the combinations of the Q and I values can represent 256 distinct symbols that can represent 256 (e.g. numbered 0-255) distinct values of any physical parameter such as MPEG compressed image values, voice over internet protocol (VoIP) signal values, codes for 256 characters, various internet or other network protocols or the like or any combination thereof. Thus, details of coding of the original signal to be quadrature amplitude modulated are irrelevant to the successful practice of QAM or the invention (e.g. some value combinations could be allocated to MPEG image transmissions while others are allocated to VoIP, most and least significant bits (MSB and LSB) of a sample value or corresponding protocol standards of other countries). How the input information is allocated between the sixteen allowable Q values and sixteen allowable I values is also irrelevant to the practice of the invention. A greater or lesser number of each of the Q and I dimension values may be allowed and thus any arbitrary number of combinations of allowable discrete values may be uniquely represented as may be visualized as vectors 41, 42, 43 and/or 44 each having a unique combination of amplitude (r) and phase (θ).

Figure 1B:
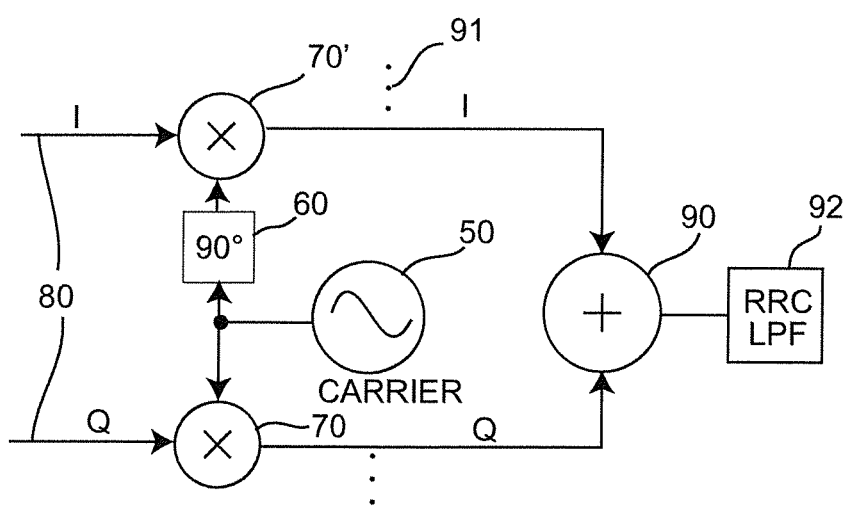

The basic technique and apparatus for performing quadrature amplitude modulation is simple and well-known and is illustrated in FIG. 1B. Basically, a local oscillator 50 operating at a carrier frequency provides an output at a desired frequency. This output is provided to multipliers 70 and 70' with a 90° phase shift applied to the signal applied to multiplier 70'. Multipliers 70 and 70' also receive an input signal 80 in the form of discrete amplitude samples. The multiplication of the input and carrier frequency signals yields two signal trains having a number of discrete signal amplitude levels (16 in the 256 symbol case) and which are 90° out of phase with each other. These signal trains are then added together at adder 90 to result in a waveform having a number of discrete levels which are overlapped with each other by a 90° phase delay; allowing each of the Q and I signal trains to be easily recovered through independent detection.

In practice, for a broadband communication system, the signal processing and apparatus depicted in FIG. 1B would be applied in parallel for each of a plurality of signal bands corresponding to different carrier frequencies derived through separate local oscillators 50 as indicated by dots 91. This parallel operation accommodates more channels than can be transmitted in a single QAM band and produces a signal having a spectrum very similar to that illustrated in FIG. 2B, details of which will be discussed below in connection with FIG. 3. Also, additional filtering such as band pass filtering and so-called root raised cosine (RRC) filtering 92 will be applied to prevent out of band frequencies from being generated.

The term root raised cosine (RRC) refers to the shape of the roll-off of the low pass filter which is preferably of a cosine shape that is "raised" to have a minimum of zero after it is applied twice (once in the transmitter and once in the receiver) and thus squared. Thus, the filter roll-off function is preferably the square root of the raised cosine function or "root raised cosine" which is relatively easy to precisely duplicate to provide matched filters in the transmitter and receiver, as will be discussed in greater detail below. In practical effect, the root raised cosine filter "softens" the step-wise variation in the signal to reduce harmonic content at high harmonics of the symbol rate while providing improved rejection of noise that may have ingressed into the signal during transmission by being closely matched to the filter at the transmitter. Particularly in this regard, while the transmitted QAM signal is digitally generated, the QAM signal represents only discrete amplitude values of two signal trains in which the relative amplitudes of Q and I pairs of signals contain phase information as real and imaginary values, the QAM signal is, itself, a real signal and, moreover, should be regarded as an analog signal during transmission and for an initial portion of the QAM signal detection processing as will be described below.

The carrier frequency is generally suppressed as depicted by solid and dashed lines 95 and 95' such that the spectrum of each frequency band 100a, 100b . . . 100n (each being referred to as a QAM band or, simply, a QAM) is essentially flat over the principal portion of the band (although amplitude of individual frequencies may instantaneously vary with the symbol values of the data being transmitted) with a sharp roll-off 96 at the ends of each band such that the interband interference where the signals in each band overlap 97 with an adjacent band is sufficiently and acceptably small. In the United States, the nominal spectral width of a QAM band is 6 MHZ with the occupied bandwidth frequencies limited to about 5.36057 MHZ, as illustrated in FIG. 3. The maximum available symbol transmission rate (e.g. frequency of discrete symbols) is constant for all QAM carrier frequencies. Since the signal transmitted in each QAM band will be a step-wise varying signal which includes amplitude transitions which may be very large, the number of discrete frequencies that appear in each QAM band will be very large. Thus the overall spectrum of the signal transmitted over a broadband communication system will include many different frequencies of similar signal strength and the overall spectrum will be very similar to that of background white noise over a similar range of frequencies as shown in FIG. 2A and as alluded to above.

Figure 2A:
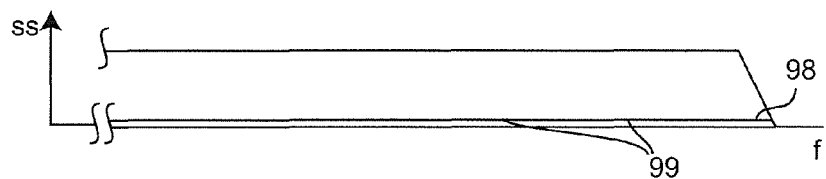
Figure 2B:
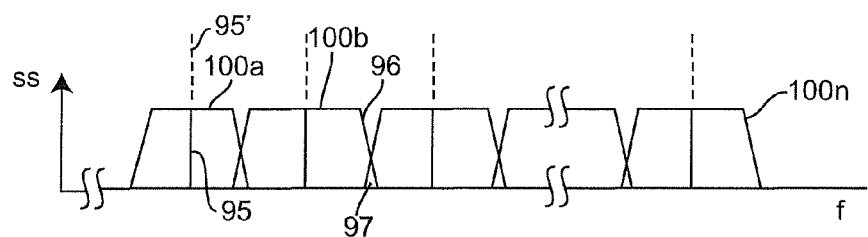
Figure 3:
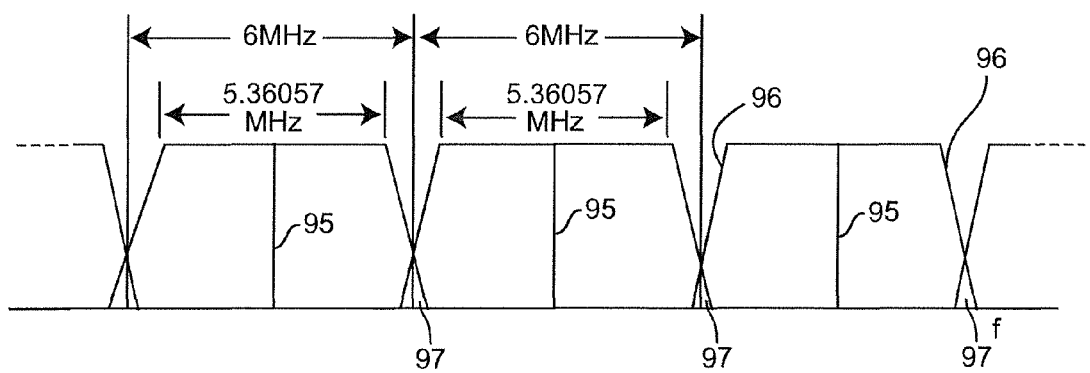
FIG. 3 is an enlarged view of several adjacent QAM bands of a broadband communication system signal.

If an egress signal is actually present in such broadband background noise, it will probably exist only as a very minor component thereof at distances from the egress site/shielding flaw of more than a few yards as illustrated for comparison at 98 and where the roll-off 96 and overlaps 97 depicted at 99 of FIG. 2A are undetectable. For that reason, the active inclusion of a marker signal has generally been considered to be necessary to detection of an egress QAM modulated signal amid background noise, even though issues of bandwidth dedicated to the marker signal and interference of the marker signal with adjacent QAM bands necessarily follow from the inclusion of a marker signal; an acceptable solution to which is provided in the above-incorporated U.S. patent application Ser. No. 13/080,715.

Figure 4:
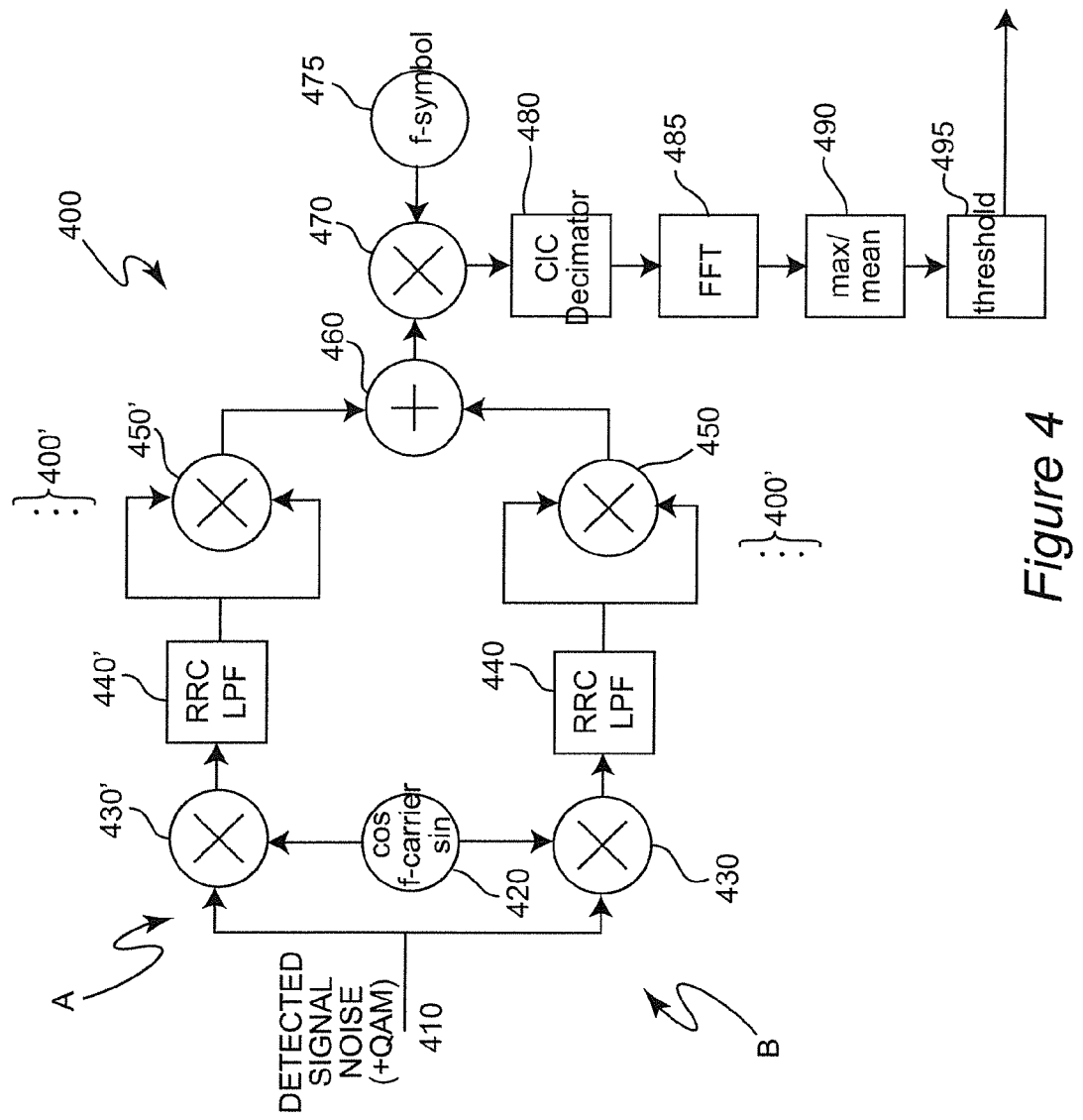
FIG. 4 is a high-level block diagram of the passive egress signal detection system in accordance with the invention.

The preferred embodiment of a passive egress signal detection arrangement of the present invention is illustrated as a high level block diagram in FIG. 4. It should be appreciated that the sole function of the system of FIG. 4 is to determine whether or not the input detected signal contains any spectral components which are distinctive and specific to a QAM signal, even if the QAM signal is deeply buried in noise. It should also be appreciated that, in regard to the broadband communication system, the QAM detection system of FIG. 4 is entirely passive with regard to the broadband communication system with which it is employed and requires no marker signal, dedication of any bandwidth or any other modification of the broadband communication system in order to be used for detection of shielding flaws in that system.

A detected signal that may or may not include a QAM signal is input to the system of FIG. 4 as illustrated at 410 or FIG. 4. In the following discussion, it will be assumed that a QAM signal is, in fact, present at a relatively low level amid background noise having a spectrum as depicted in FIG. 2A and that the input signal can properly be referred to as signal plus noise. The received signal plus noise is mixed with a quadrature (e.g. having sine and cosine outputs 90° out of phase with each other) local oscillator (LO) 420 tuned to the carrier frequency at multipliers 430 and 430' respectively. This mixing converts the input to a quadrature baseband signal centered on DC in each signal path of separate signal paths A and B. Exemplary signals resulting from this mixing are shown in FIG. 5A. These signals are not the same since the I and Q components of a quadrature source are not the same and the transmitter phase relationship is unknown at the receiver and, in fact, is not recovered in the practice of the preferred embodiment of the present invention. Thus the mixing of these signals performs a function similar to sampling.

As alluded to above, these quadrature baseband signals are then filtered using root raised cosine (RRC) low pass filters (LPFs) 440, 440' for pulse shaping and preferably matched to the RRC LPF used in the modulator as described above in connection with FIG. 1B. The pulse shaping performed by filters 440, 440' is illustrated by dashed lines in FIG. 5A. The pulse shaping tends to reject some degree of noise that may be present in distortion of the pulses by matching the pulse shapes to the pulse shapes as transmitted; which noise may have been acquired in the signal during processing or transmission, ingress through a shielding flaw or the like. At this point in the processing, it is considered desirable to perform high frequency sampling (e.g. at about 15 MHZ or, preferably, substantially higher) and to perform the remainder of the processing digitally. However, such an analog to digital conversion at this point is considered to be a matter of processing economy and is not critical to the successful practice of the invention. That is, the analog to digital (A/D) conversion could be done earlier but higher frequency sampling and increased processing power would be required. Alternatively, the analog to digital conversion could be performed later or not at all but sensitivity, noise immunity and response time would be compromised as will become more apparent from the following discussion.

The two quadrature component signals resulting from the RRC filtering, sampling and A/D conversion are then optionally but preferably multiplied by themselves (e.g. squared) at 450, 450' and summed at adder 460 to generate a signal that is the squared instantaneous envelope of the input signal, an exemplary form of which is illustrated (not to the same scale as FIG. 5A) in FIG. 5B.

Note that all squared values are necessarily positive. This has the effect of collapsing all four quadrants of FIG. 1A into a single quadrant where some vectors amplitudes and phases are duplicated and effectively concentrate the information present in the signal and expand the dynamic range relative to the quadrature signals. Further, it should be noted that the squared envelope signal is no longer a quadrature signal but a real signal and the positive and negative frequency bands in the spectrum of the squared envelope signal are mirror images of each other. For these reasons, the squaring of the quadrature component signals is very much preferred since the collapsing of the symbols into one quadrant not only provides real signals of a single polarity but statistically tends to emphasize the symbol (baud) rate component of the signals since all symbols are overlaid on one quadrant.

The spectrum of the squared envelope signal is shown in FIG. 5C. (It should be understood that spectral analysis has not been performed at this point in the detection processing but the spectrum is illustrated in FIGS. 5C-5E to convey an understanding of the problems of QAM signal detection that are overcome by the invention.) As illustrated, in addition to the noise and various permutations of modulation data (assumed to be present) are spread over the frequency band (e.g. corresponding to a single QAM band) being processed, this squared envelope may have three discrete and distinct frequency components: DC and plus and minus the QAM symbol (baud) rate, $f_{baud}$. That is, the plus and minus QAM symbol rate components will be absent if no (leakage or egress) QAM signal is present but should be present and theoretically detectable if QAM signal leakage or egress is present. The DC signal component will always be present, even in noise, and is significantly stronger than the plus and minus QAM symbol rate frequency components, if present. Conversely, the plus and minus QAM symbol rate signals will only be present if there is an egressing QAM signal. If the SNR were vastly improved, these symbol rate components could theoretically be used for synchronization of a receiver. Unfortunately, the DC component, which is the strongest component of the squared envelope signal, is also present in random noise. Therefore, the presence or absence of a QAM signal must be determined from the much weaker QAM symbol rate frequency components.

In order to do so, in accordance with the invention, the preferably squared envelope signal (or other signal corresponding to the baseband quadrature signal) is mixed, at multiplier 470, with the output of another local oscillator 475 tuned to the QAM symbol rate of the QAM band being examined and which is known. This mixing translates the squared envelope (or other signal) such that the known symbol rate of the QAM band is translated to DC which can then be (optionally) optimally low pass filtered to limit the spectrum to the frequency band of interest and, preferably, may also include decimation to reduce the required processing rate as will be discussed in greater detail below. Assuming such filtering for clarity of explanation and illustration, the resulting spectrum is shown in FIG. 5D. As a practical matter, however, similar limitation of the spectrum to the band of interest and isolation of the signal component at $f_{baud}$ is accomplished using a cascaded integrator-comb (CIC) decimator. In this term, the word "cascaded" refers to a plurality of stages of integration and comb filtration which can be performed in a pipelined fashion or performed recursively. In the interest of clarity, a pipelined process is shown in FIG. 6. As a practical matter, pipelined processing is somewhat preferred to increase the potential frequency of QAM signal detection processing which increases the spatial resolution and reliability of detection from a mobile vehicle, as alluded to above.

As illustrated in FIG. 6, the integration portion of each stage performs a "rolling averaging" over a small number, s, of samples which, while such averaging effectively broadens the peak at the frequency of interest, the peak can be narrowed and the number of samples carried forward in the processing can be reduced by allocating only a few samples to the frequency spacing between the frequencies cut by the comb filter and representing the remainder of the signal in the frequency band of interest with a reduced number of samples at a correspondingly increased spacing. That is, the rolling average has the effect of low pass filtering the data (much in the nature of an integrator) to provide a DC roll-off low pass filter with a constant dB/octave slope. Since each stage of CIC processing significantly reduces the number of samples carried forward for further processing, the processing is properly referred to as decimation. In other words, because the integrator and comb filter have the effect of low pass filtering of the data, the data can be re-sampled at a lower rate by simply eliminating intervening samples without aliasing.

As alluded to above, the sampling of the signal at the output of filters 440 and 440' must be at a very high sampling rate in order to represent the input signal with good fidelity. However, since the spectrum must be evaluated in processing intensive operations 485 and 490, as will be discussed in greater detail below, and since the egress signal detection is preferably performed from a moving vehicle, at the present state of the digital data processor art, the number of samples which must be processed for evaluation, as a practical matter, are preferably reduced such that the evaluation processing can be carried out in substantially real time with no greater processing power than is available from an embedded processor suitable for a mobile environment.

Thus, as illustrated in FIG. 6 which includes only an exemplary three CIC stages (although many more can be and preferably are provided) the integrator of each successive stage has the effect of reducing the slope of the spectrum of the background noise and broadening the peak of interest at $F_{baud}$. The peak of interest is then narrowed by the succeeding comb filter stage. That is, the integrator is effectively a low pass filter which, when combined with a comb filter, becomes a sliding window average which is essentially also a low pass filter. It should be noted that the frequency range between the frequencies cut by the comb filter is preferably narrowed in each succeeding CIC stage. The peak of interest at $f_{baud}$ (appearing at DC as described above) can then be represented by only a few samples and the sample frequency, $f_s$, and number of samples processed can be reduced accordingly, generally by a factor, s, related to the number of samples averaged in the integration portion of each CIC decimation stage; yielding an exponential reduction in effective sample rate over the number of CIC decimation stages provided. The possibility of masking of the frequency of interest is not a problem since the number of samples averaged can actually be extremely large since the symbol rate is being taken all the way down to DC and is performed in multiple stages for efficiency. The overall effect of this processing is to develop a very large reduction in sample rate for processing efficiency and improved response time.

It should be understood that while the above processing has been explained in accordance with illustrations of the spectrum of the signal resulting from each process, the above-described processes are digitally performed on samples of an essentially analog signal in the time domain. Referring again to FIG. 4, it is only at this point that the invention evaluates the spectrum of the signal resulting from the above processing for developing an improvement in SNR and spectral processing, preferably by a fast Fourier transform (FFT) processor, is performed at operation 485 which has the effect of decreasing the noise bandwidth relative to the signal of interest. This FFT operation results in the spectrum substantially as shown in FIG. 5E which can be evaluated for the maximum and mean values of the spectrum. If a QAM signal is present, the mean value of the spectrum will be slightly above the level of the spectrum of the background noise and a significant peak will appear at DC (representing $f_{baud}$ due to the mixing of $f_{baud}$ from local oscillator 475 with the squared envelope signal at 470). If no QAM signal is present, the maximum value will be at or near the background noise level and no peak at DC will appear. However, although exceeding unlikely, it is possible that some peak may appear at DC due to some quality of the background noise in a particular location or due to some free-space broadcast signal. In any case, the spectrum, by its nature, will be somewhat noisy and there is significant likelihood that a "max-over-mean" computation will have some finite value that may or may not reflect the presence of a QAM symbol rate component. Therefore, to avoid false positive detections, it is preferred to evaluate the maximum value and the mean value of the spectrum quantitatively as illustrated at 490 and to compare the difference (determined by linear division or simply by subtraction if calculated in dB) to a threshold as illustrated at 495 to determine the actual existence of an egress signal of sufficient signal strength to warrant the expense of further investigation by dispatching maintenance personnel to the detection site. If the detection satisfies the specified threshold signal strength above the background noise, the existence of an egress signal and its location can be reported in the normal course. Since the maximum-over-mean value varies with SNR, it is also possible to use this result to measure the power of the original egress signal.

In view of the foregoing, it is clearly seen that the invention provides a methodology and apparatus capable of distinguishing an egress signal from a broadband communication system from broadband background noise that may include free-space transmissions on similar frequencies without requiring any marker signal, bandwidth dedication or any other modification of a broadband communication system and is thus entirely passive in regard to the system with which it may advantageously be used. While the system has been found reliably operable, the robustness of it operation can be increased by simultaneously performing the detection methodology described above in different QAM bands as depicted by dots 400'. Further, upon apparent detection of an egress signal, further confirmation can be provided by a temporary modification of a signal transmitted over the broadband communication system such as a reduction of QAM symbol rate in a given QAM band (that might be achieved, for example, by a marginal increase in the degree of MPEG compression of an image signal) which, while preferably limited to a change which does not cause a perceptible change in system performance, has the potential for unequivocal confirmation of an egress signal as well as the potential for distinguishing between overbuilt broadband communication systems. However, the system is highly effective without use of any such perfecting feature since it directly detects QAM signals which are used almost exclusively in broadband communication systems and thus a detected signal having uniquely QAM characteristics is almost necessarily an egress signal.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A detector for determining presence or absence of a quadrature amplitude modulated (QAM) signal having a known symbol rate egressing from a broadband communication system (BCS), said detector comprising
   a mixer to mix a signal received from an environment in a vicinity of said broadband communication system with an oscillator output wherein said oscillator is tuned to operate at a carrier frequency of a QAM band, to develop a quadrature baseband signal,
   a further mixer for mixing a signal corresponding to said quadrature baseband signal with an output of a further oscillator wherein said further oscillator is tuned to operate at a QAM symbol rate of said QAM band, and
   a processor to analyze a spectrum of an output of said further mixer to determine said presence or absence of a signal at a frequency corresponding to said QAM symbol rate.

2. The detector as recited in claim 1, further comprising a multiplier to multiply said quadrature baseband signal by itself to provide a summed squared instantaneous envelope signal as said signal corresponding to said quadrature baseband signal.

3. The detector as recited in claim 1, wherein said processor is a fast Fourier transform processor.

4. The detector as recited in claim 1, further including a filter for pulse shaping of respective components of said quadrature baseband signal.

5. The detector as recited in claim 4, wherein said filter is matched to a pulse shaping filter in a QAM modulator.

6. The detector as recited in claim 4, wherein said filter is a raised root cosine low pass filter.

7. The detector as recited in claim 1, further including
   an analog to digital converter for converting said quadrature baseband signal to digital form.

8. The detector as recited in claim 7, wherein said analog-to-digital converter samples said quadrature baseband signal at a rate of 15 MHZ or higher.

9. The detector as recited in claim 1, further including
   a low pass filter to limit a spectrum of an output of said further mixer.

10. The detector as recited in claim 1, further including
    a cascaded integration-comb decimator.

11. The detector as recited in claim 1 wherein said detector is a hand-held device or carried in a mobile vehicle.

12. A method for determining presence or absence of a quadrature amplitude modulated (QAM) signal having a known symbol rate and egressing from a broadband communication system (BCS), said method comprising steps of
    mixing a signal received by a receiver from an environment in a vicinity of said broadband communication system with an oscillator output wherein said oscillator is tuned to operate at a carrier frequency of a QAM band, to develop a quadrature baseband signal,
    further mixing a signal corresponding to said quadrature baseband signal with an output of a further oscillator wherein said further oscillator is tuned to operate at a QAM symbol rate of said QAM band, and
    analyzing a spectrum of an output of said further mixer to determine presence or absence of a signal at a frequency corresponding to said QAM symbol rate.

13. The method as recited in claim 12, further comprising
    multiplying said quadrature baseband signal by itself and summing to provide a squared instantaneous envelope signal as said signal corresponding to said quadrature baseband signal.

14. The method as recited in claim 12, wherein said step of analyzing a spectrum comprises a fast Fourier transform process.

15. The method as recited in claim 12, further including pulse shaping of respective components of said quadrature baseband signal.

16. The method as recited in claim 15, wherein said pulse shaping is matched to pulse shaping in a QAM modulator.

17. The method as recited in claim 15, wherein said pulse shaping is performed by a raised root cosine low pass filter.

18. The method as recited in claim 12, further including converting said quadrature baseband signal to digital form.

19. The method as recited in claim 18, wherein said converting step samples said quadrature baseband signal at a rate of 15 MHZ or higher.

20. The method as recited in claim 12, further including limiting a spectrum of a result of said further mixing step.

21. The method as recited in claim 12, further including cascaded integration-comb decimation of a result of said further mixing step.

22. The method as recited in claim 12 including the further step of moving said receiver through said vicinity in which a BCS is located.

* * * * *